(12) United States Patent
Abahusayn

(10) Patent No.: US 11,890,566 B2
(45) Date of Patent: Feb. 6, 2024

(54) ATMOSPHERIC AEROSOL COALESCER

(71) Applicant: Mansur Abahusayn, Mission Viejo, CA (US)

(72) Inventor: Mansur Abahusayn, Mission Viejo, CA (US)

(*) Notice: Subject to any disclaimer, the term of this patent is extended or adjusted under 35 U.S.C. 154(b) by 24 days.

(21) Appl. No.: 17/471,654

(22) Filed: Sep. 10, 2021

(65) Prior Publication Data

US 2022/0370939 A1 Nov. 24, 2022

Related U.S. Application Data

(60) Provisional application No. 63/052,351, filed on Jul. 15, 2020.

(51) Int. Cl.
*B01D 46/00* (2022.01)

(52) U.S. Cl.
CPC ....... *B01D 46/003* (2013.01); *B01D 46/0002* (2013.01)

(58) Field of Classification Search
None
See application file for complete search history.

(56) References Cited

U.S. PATENT DOCUMENTS

| | | | | |
|---|---|---|---|---|
| 6,019,825 A | * | 2/2000 | Greene | B04C 5/103 96/216 |
| 7,404,837 B2 | * | 7/2008 | Killion | E03B 3/28 55/423 |
| 10,434,451 B2 | * | 10/2019 | Witchey | H04B 7/18502 |
| 2002/0011075 A1 | * | 1/2002 | Faqih | B01D 5/0087 62/285 |
| 2005/0223719 A1 | * | 10/2005 | Killion | E03B 3/28 62/93 |
| 2012/0312212 A1 | * | 12/2012 | Cruson | A01C 7/042 111/176 |
| 2013/0014710 A1 | * | 1/2013 | Munson, Jr. | B60L 1/02 122/367.1 |
| 2016/0145837 A1 | * | 5/2016 | Abrari | F03D 9/20 415/121.3 |
| 2016/0288019 A1 | * | 10/2016 | Ernst | B01D 19/0026 |
| 2017/0008014 A1 | * | 1/2017 | Van Wolferen | A47L 9/1666 |
| 2017/0361558 A1 | * | 12/2017 | Tenore | C10G 1/10 |
| 2018/0280849 A1 | * | 10/2018 | Abahusayn | B64B 1/50 |

(Continued)

FOREIGN PATENT DOCUMENTS

| | | | | |
|---|---|---|---|---|
| CN | 107059993 A | * | 8/2017 | E03B 3/28 |
| ES | 1214584 U | * | 6/2018 | |

(Continued)

*Primary Examiner* — Brit E. Anbacht
(74) *Attorney, Agent, or Firm* — Kenyon Jenckes

(57) ABSTRACT

An atmospheric aerosol coalescer (AAC) is a device for collecting water from cooling tower plumes, fog. The AAC may include tapered spiral tube body with a helix shaped skin for atmospheric aerosol to pass through. Micro-droplets of water in air, as in cooling tower plumes, fog, separate inside the AAC due to large density difference and centrifugal forces inside the spiral tube. 3-100-micron diameter water micro-droplets may grow to 1000-4000 micron drops by coalescence on the internal walls of the AAC. Big drops detach to a drain at its base and fall through a spout to a collection pond. A number of AAC arrays may be supported by a net or an inflated pad. The net or inflated pad may be lifted by a tethered aerostat.

13 Claims, 8 Drawing Sheets

(56) References Cited

U.S. PATENT DOCUMENTS

2018/0320277 A1\* 11/2018 Kingsley ................. F03D 15/00
2020/0277761 A1\* 9/2020 Carrington ............... B01D 5/00
2020/0298174 A1\* 9/2020 Boudreault ............ B01D 53/02

FOREIGN PATENT DOCUMENTS

WO     WO-2015164895 A1 \* 11/2015    ............... E03B 3/28
WO     WO-2022126288 A1 \* 6/2022
WO     WO-2022211666 A1 \* 10/2022    ............... E03B 3/28

\* cited by examiner

ATMOSPHERIC AEROSOL COALESCER

CROSS-REFERENCE TO RELATED APPLICATIONS

This application claims priority to U.S. Provisional Patent Application No. 63/052,351, entitled "Atmospheric Aerosol Coalescer", and filed Jul. 15, 2020, the entirety of which is incorporated by reference.

BACKGROUND

The technical field of the disclosed embodiments relate to atmospheric aerosol coalescence devices. More particularly, the disclosed embodiments relate to coalescing micro-droplets of water from cooling tower blooms, fog, and clouds to form large drops of water that fall by gravity.

SUMMARY

Disclosed are various embodiments of an atmospheric aerosol coalescer. It is a light tapered spiral tube section open on both ends. It produces a helix path for gas carrying aerosols. It coalesces fog and cloud water micro-droplets, carried in the atmospheric gas stream passing through it, to large drops that slide to its base then fall to the ground by gravity for collection.

Fog and cloud liquid micro-droplets suspended in moving air separate and impinge on the coalescer internal surface due to centrifugal forces and surface tension. The micro-droplets grow by coalescence to big drops that fall for collection and use.

The coalescer may be made from a relatively light and inexpensive strong, UV-treated semi-rigid material. A number of coalescer devices, or "coalesces", may be deployed extensively and supported by a net or other substrate in the open atmosphere. A tethered aerostat provides lift for higher liquid water content. Large surface area and higher collection efficiency provide commercial quantities of water from fog and clouds.

In an embodiment, the coalescer may be an atmospheric aerosol coalescer (AAC) having a body with a spiral shape and including an interior surface, a front end, and a rear end. The AAC may include a liquid drain and a drain spout. The AAC may be constructed from a UV treated plastic, and the interior surface including a hydrophobic material.

In an embodiment, the body has a helical shape. The front end of the body may have a diameter between 1 and 20 centimeters, and may be larger the same size as the rear end. The AAC may have a mass of about 8 grams or less.

DETAILED DESCRIPTION

Figure 1:
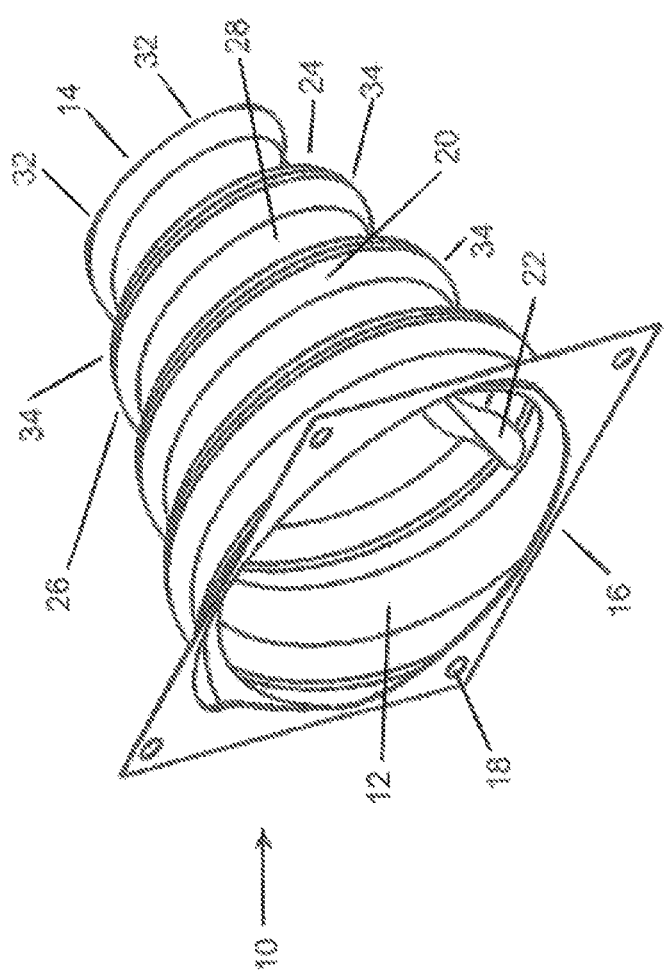
FIG. 1 is a perspective front-side view of an atmospheric aerosol coalescer according to an embodiment.

FIG. 1 shows a perspective front-side view of an atmospheric aerosol coalescer (AAC) 10. AAC 10 is a device for coalescing liquid micro-droplets of about 3-100-micron diameter into large drops of about 1000-4000-micron diameter.

AAC 10 may have a spiral flute shape. Aerosol-laden gas may enter AAC 10 through entry 12. Atmospheric gas passing through AAC 10 is stripped of its liquid aerosol and exit through exit 14. Liquid drain 22 is located at the helix base 28 of AAC 10. AAC 10 front frame 16 may have a square shape and have a fastener receptor 18 to attach adjacent AAC 10 together. AAC 10 has a very thin helix skin 20 that forms AAC 10 corrugated flute tube 24. Corrugated flute tube 24 has helix ridge 26 and helix base 28. AAC 10 liquid drain 22 is sloped down outwardly relative to gas flow to discharge its coalesced liquid through drain spout 30.

In an embodiment, the AAC 10 receives atmospheric aerosol-laden gas through its front entry 12. Helix skin 20 of the spiral flute tube 24 forces the aerosol laden gas to spiral inside it. Centrifugal forces created by the helix 12 shape propel aerosol particles to separate from the gas and impinge on the inner skin of the spiral flute 24. In the case of cooling tower plumes, fog and cloud, the aerosol is micro-droplets of water having a density many times greater than that of the air in the open atmosphere. The micro-droplets adhere to the inner surface of spiral flute tube 24 due to surface tension and grow by coalescence to larger drops. When the force of gravity acting on the large drop exceeds the force of surface tension, large drops detach from helix skin 20 and slide down helix base 28 to liquid drain 22. The inside surface of liquid drain 22 may be hydrophobic to maintain spherical shape of large drops, minimize their contact with liquid drain 22 surface, and speed up their discharge through drain spout 30. AAC 10 is tilted downward toward back exit 14. Liquid drain 22 discharges collected liquid through drain spout 30 to the open atmosphere to be collected in a ground lined pond.

AAC 10 may be made from a light but strong material that can withstand an open environment and exposure to strong sunlight and heat, strong winds, frequent deployment, and retrieval. Examples of materials that may be used in the manufacture of the AAC 10 include semi-rigid plastics such as, polyethylene terephthalate (PET), polyethylene (PE), nylon, polypropylene, polyurethane, polytetrafluoroethylene (PTFE), graphene, and similar materials. The materials may be ultraviolet (UV) treated.

The coalescer material should be about 8-gram or less per AAC 10 to increase surface area, produce commercial yield, and not exceed the payload limit of the aerostat. AAC 10 may be manufactured using standard plastic processes like thermoforming and blow molding.

In an embodiment, AAC 10 arrays may be produced in a one square meter mold to produce one hundred coalescers, or two-by-two meters for a yield of four hundred, or more to decreases production, assembly, and installation costs. A number of AACs 10 could be attached to nets of desired size, weight and pull strength. Such nets may be suspended from the aerostat and facing aerosol flow to coalesce aerosols. The internal surface of liquid drain 22 is preferably made hydrophobic to enhance the spherical shape of the large aerosol drops and speed their discharge to the open atmosphere for collection in a pond or on the ground.

Figure 2:
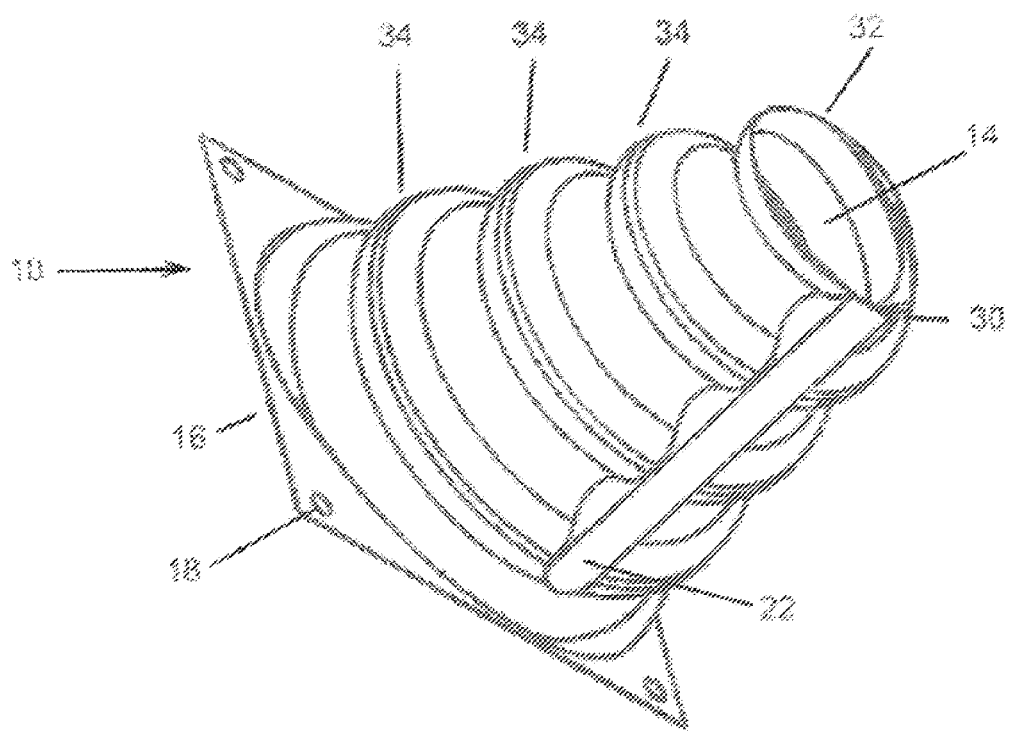
FIG. 2 is a perspective back-side view of the atmospheric aerosol coalescer according to an embodiment.

FIG. 2 is a back-side view 32 of the AAC 10. Liquid drain 22 is shown along the length of helix base 28. Liquid drain 22 terminates in drain spout 30 where its collected water is discharged to the atmosphere and fall by gravity for collection in a pond on the ground.

The AAC 10 front entry 12 may have a substantially circular shape, with a diameter range of about 1 to 20 centimeters, with 5 to 20 cm spirals, and about an 0.5 to 3-centimeter deep flute ridge 34. Front frame 16 may be a semi-flexible square of about 3-30-centimeter range per side. Corners of adjacent AACs 10 may be aligned to be held together using the fastener receptor 18. The fastener receptor 18 joins adjacent coalescers loosely to allow AACs 10 to stack when the net carrying a number of AACs 10 are retrieved to the ground. A number of AACs 10 may be attached together and held by a net to form a large matrix of AACs 10 that coalesce fog and cloud micro-droplets. Such extensive arrangement produces commercial quantities of water for human, agricultural, forestation, industrial and other uses.

Figure 3:
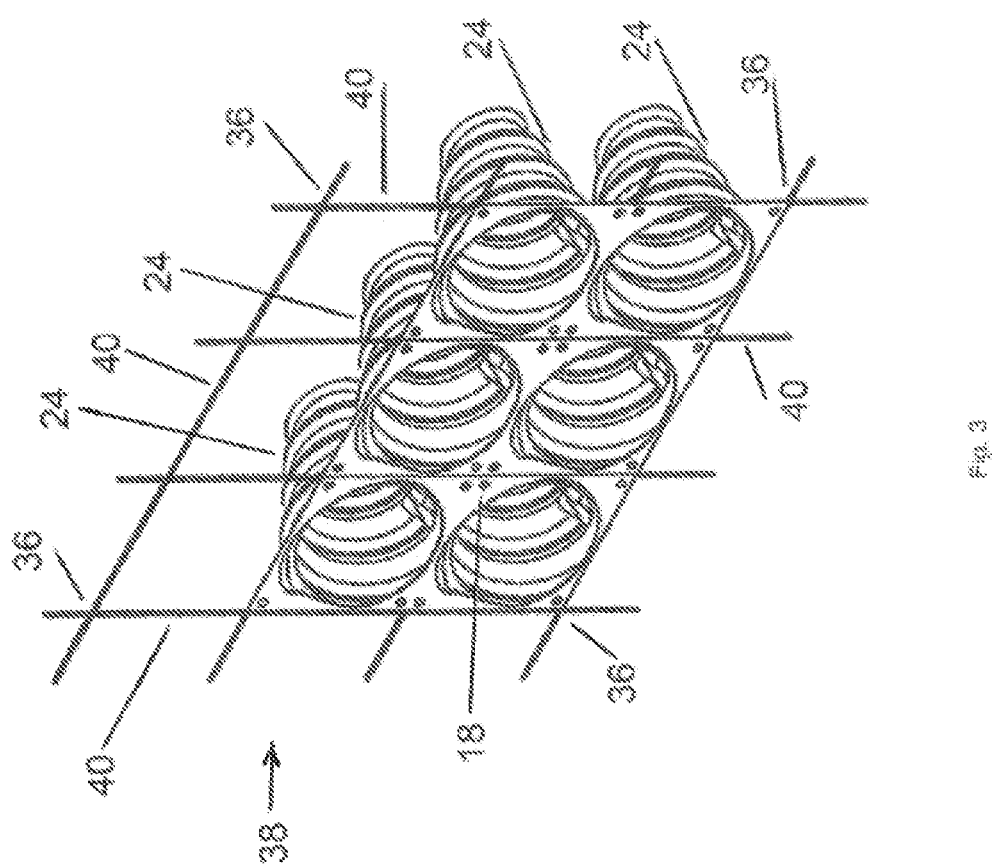
FIG. 3 is a perspective view of an atmospheric aerosol coalescer array supported by a net according to an embodiment.

FIG. 3, shows an AAC 10 array 38 is shown supported by an array support structure. In an embodiment, a net 36 serves as the array support structure. The net 36 includes net strings 40 which support an array 38 of AACs 10 to intercept aerosol carrying air. AAC 10 array 38 may intercept atmospheric gas flow when net 36 is deployed vertically and AAC 10 array 38 faces an aerosol-laden gas flow. The advantages of vertical deployment of the net 36 supporting AAC 10 array 38 facing the gas flow are to decrease lateral footprint and increase the yield of aerosol collection. Liquid water content (LWC) increases significantly from the 0.05 grams/m$^3$ for fog near the ground to more than 1.0 g/m$^3$ for low warm clouds at 50 meters and more from the ground.

Figure 4:
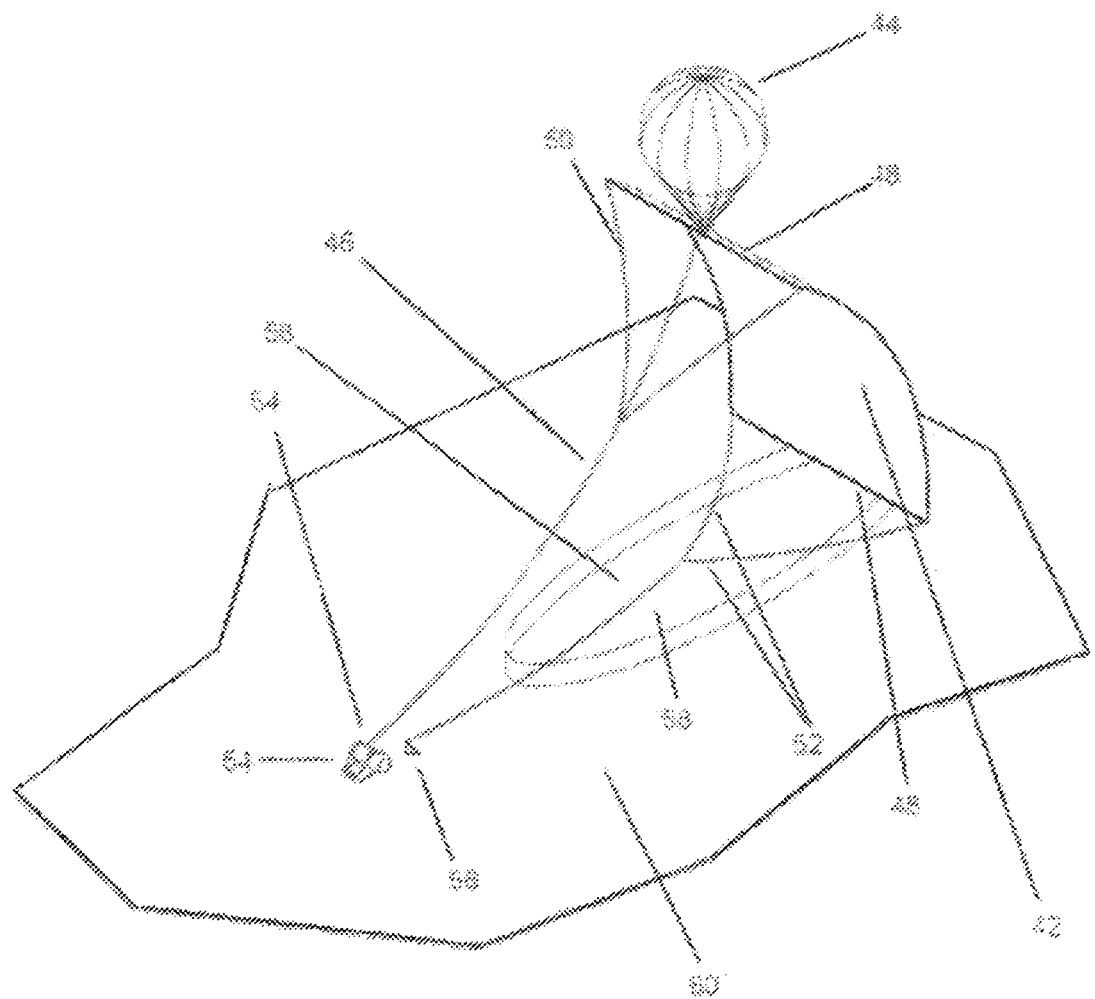
FIG. 4 is a perspective of a vertically deployed aerostat net in open atmosphere carrying a number of atmospheric aerosol coalescers according to an embodiment.

FIG. 4 shows a perspective of a vertically deployed aerostat 44 supporting a fully deployed net 42 in an open atmosphere. Fully deployed net 42 supports plurality of AAC 10 arrays 38. Fully deployed net 42 is lifted by aerostat 44 and anchored to the ground 60 by main tether 46. Aerostat 44 lifts the fully deployed net 42 carrying AAC 10 array 38. Suspension rigid support 48 holds net 42 open. Aerostat 44 along with net 42 and AAC array 38 may be retrieved by winch 54 and marooned to ground 60 if no fog and cloud are present to intercept. Upper stabilizing cable yoke 50 and lower stabilizing cable 52 maintain net 42 facing the wind when deployed. Net 42, carrying AAC 10 array 38 is anchored to ground 60 by fixed tether 56 and anchor point 58. Water falling from liquid drains 22 may be collected in collection pond 58 on the ground 60. The size and orientation of collection pond 58 is determined after field piloting in the site where the system will be installed.

The fully deployed net 42 carries a number of AAC 10 arrays 38. In an embodiment, fully deployed net 42 may have a surface area of 4000 square meters and carry 400,000 of 10 cm square AACs 10. The AAC 10 arrays 38 are not shown on the net 42 because of their small scale. Each AAC 10 collection surface area is about 0.06 square meters, for the above example.

The surface area of AAC 10 includes the internal surface that contacts the passing gas and aerosol passing inside it. The total internal surface area of all AAC 10 array 38 that are supported by fully deployed net 42 may be about 25,000 square meters. At a wind speed of 3 meters per second, a liquid water content of 1 gram/m$^3$, 50 foggy and cloudy days of the year, a collection efficiency with of 50%, and water use efficiency of 90%, the total amount of water collected by AAC 10 arrays 38 supported by net 42 may be about 150,000 cubic meters per year. One major element to consider is the payload balance under prevailing weather conditions when the system is deployed. In the above example, the aerostat 44 is a helium filled balloon of 8-meter diameter. Such an aerostat could be supplied and safely deployed and retrieved from the company Aeroballoon.com. The Aeroballoon company has a good record of deploying such balloons safely to heights of 350 ft and more the past 20 years. The payload is about 4000 kilograms. A single AAC 10 weigh may weigh about 8 grams or less. Fully deployed net 42, tether and all other air-borne components are included. The total weight of the airborne components of the system are within the aerostat payload safety limit.

In an embodiment, the previously described setup may be deployed on a much smaller scale, such as providing a house with water from fog and clouds. A smaller number of AACs 10 in a smaller net could be deployed to much higher elevations. An aerostat that reaches this elevation with a small to medium payload is that supplied by Helliekite.co of the UK. It reaches 7000 ft. A very thin and light tube to convey the collected water may be attached to its tether. Such arrangement could transport the collected water from the AAC 10s to a tank to supply a dwelling with its water needs.

The advantages of various embodiments may include: a) production of good quality water from a renewable source in water stressed locations with fog and low clouds, b) enable commercial production of good quality water, c) provide an economical source of good quality water instead of desalinated seawater pumped to high elevations, d) reduce energy compared to seawater desalination lifted to mountainous regions, e) minimize effluent compared to desalination plants, f) reduced footprint due to the vertical deployment of the fog and cloud water collection system, g) less intrusive as system deploys to high elevations only when it is foggy or cloudy, h) contribute to mitigation of climate change when the system utilizes renewable energy to operate at near zero carbon footprint, I) encourage rural development of agriculture, forestry, industry and other uses that require sustainable and reasonably priced source of water, j) support covid-19 social distancing recommendations by providing water for rural development and mitigate endemic and pandemic diseases associated with human crowding, k) support industrialization by establishing water bottling plants, and l) collect water from blooms of thermal water cooling towers.

The combined deployment of extensive surface area of AAC 10 array 38 vertically and facing rich aerosol gas flow, high LWC due to elevation, and high efficiency of aerosol extraction due to the design of AAC 10, enable commercial production of water from fog and warm clouds. The various embodiments could extend to recovery of water from cooling tower blooms, or recovery of any liquid from a gas for other applications.

Figure 5:
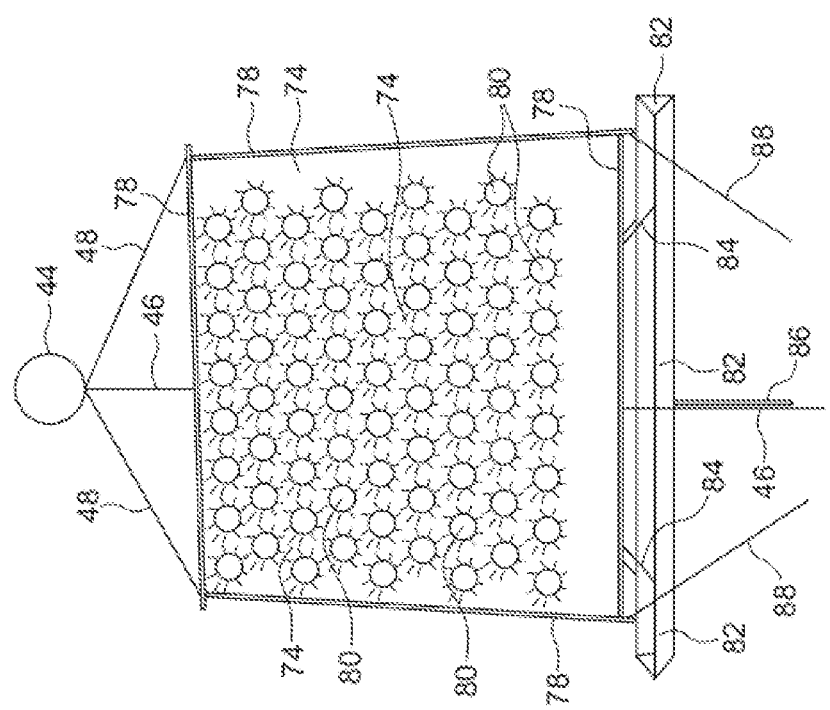
FIG. 5 is a perspective view of an inflated pad deploying atmospheric aerosol collectors in inflated pad cavities forming an array for high elevation fog/cloud water collection according to an embodiment.
Figure 6:
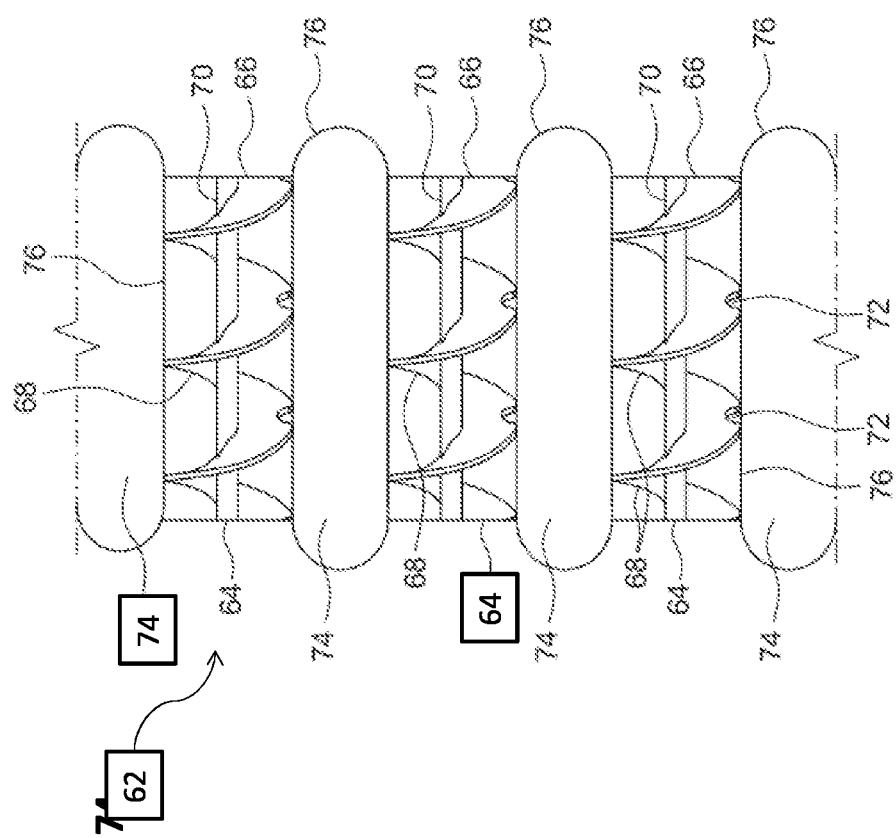
FIG. 6 is side view of an atmospheric aerosol coalescer plugged into an inflated pad cavity according to an embodiment.

An alternative device shape and deployment are shown in FIGS. 5 and 6. FIG. 5 shows an inflated pad 74 serving as the array support structure. The inflated pad 74 includes a number of AACs 62 (FIG. 6) in an inflated pad cavities 80. The inflated pad 74 with the array of AACs 62 may be deployed at high elevation for fog/cloud water collection. The aerostat 44 lifts the inflated pad 74, which is held in place by suspension support 88. Rigid frame 78 and inflated pad stabilizing cable 88 may hold the inflated pad 74 straight and facing fog/cloud flow. Water collected by AAC 62 is discharged by water collection trough 82 held in place under inflated pad 74 by trough support cable 84 and drained by main drain 86 to a ground reservoir. Using the inflated pad 74 aids deployment with increasing payload as inflated pad 74 is made from a very strong, light and airtight material such as silicone coated nylon as used in large para-sails and may be filled with helium.

FIG. 6 is side view of AAC 62 plugged into inflated pad cavity 80. AAC 62 may be a spiral device, made of light but durable rigid plastic such as PET, aluminum, or other light, rigid materials. It receives gas laden with micro-droplets of liquid, such as in cooling tower plumes, fog, through its front 64. Front 64 is conical in shape made so by the inflated pad skin 76. The gas flow pattern is changed by the spiral vane 68, supported by column 70, to rotational flow. Rotational motion produced by vane 68 isolates micro-droplets from gas stream and propels micro-droplets of liquid to an internal wall of AAC 62, which is defined by the lining of the inflated pad cavity 80. As micro-droplets of liquid coalesce on lining pad cavity 80 their size grows to where the weight of a liquid drop overcomes the surface tension holding the drop to the pad cavity wall 80, and the drop slides to the bottom of the inflated pad cavity 80 where it is discharged outwardly through drain 72. Gas exits through the back 66 of AAC 62. Discharged liquid from drain 72 is collected in trough 82 of FIG. 5 and discharged to a ground reservoir through the main drain 86.

Figure 7:
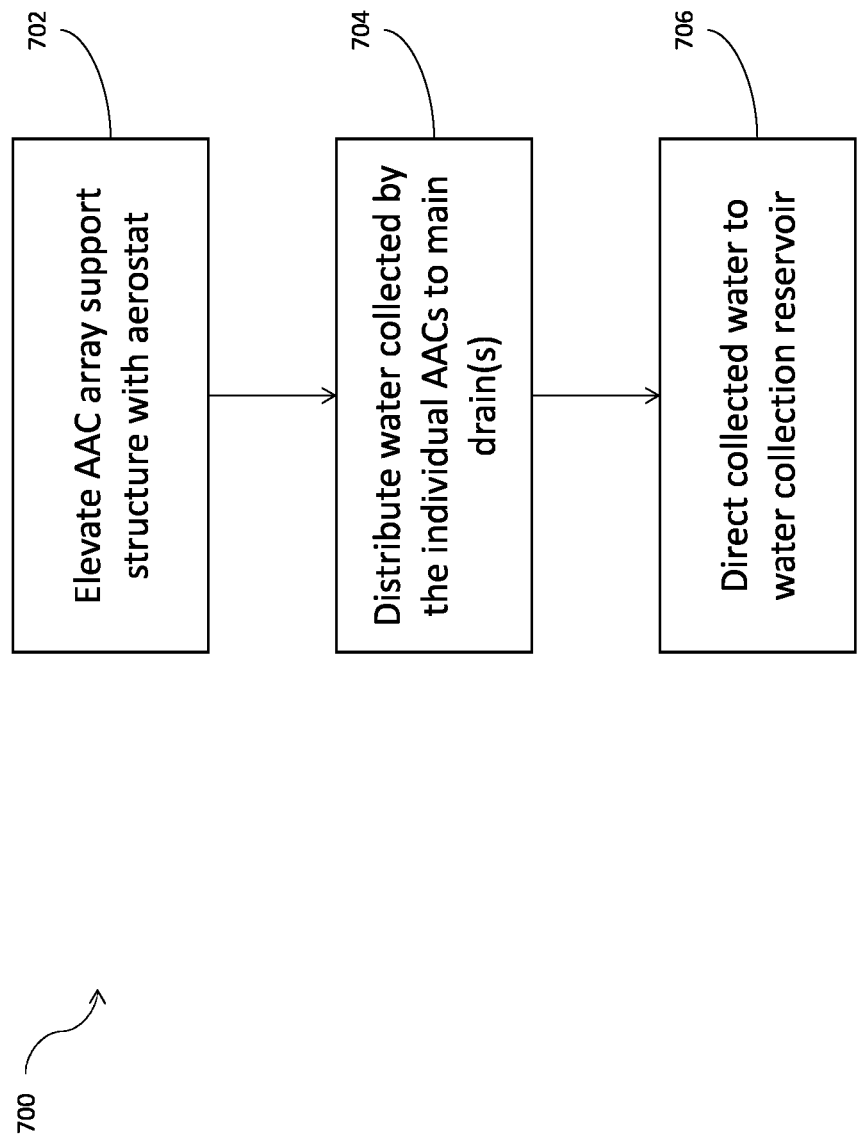
FIG. 7 is a flowchart describing a method for collecting water from an aerosol-containing atmosphere according to an embodiment

FIG. 7 is a flowchart describing a method 700 for collecting water from an aerosol-containing atmosphere according to an embodiment. An atmospheric aerosol coalescer (AAC) array support structure including a number of, e.g., hundreds of, AACs arranged in an array may be elevated 702 with an aerostat. Water collected by the individual AACs is collected and distributed 704 to one or more main drain(s). The collected water is then directing to 706 a water collection reservoir.

In a private test performed at the University California Irvine, the performance and efficiency of an embodiment of an AAC was compared to the performance and efficiency of a typical mesh fog collector. The AAC had a spiral shape with a 10 cm front opening and weighed 8 grams. Based on similar conditions, i.e., application of a stream of fog, the AAC harvested water with a 52.2% efficiency, compared to 5% water harvesting efficiency of the mesh fog collector erected on posts 2 meters from the ground.

Figure 8:
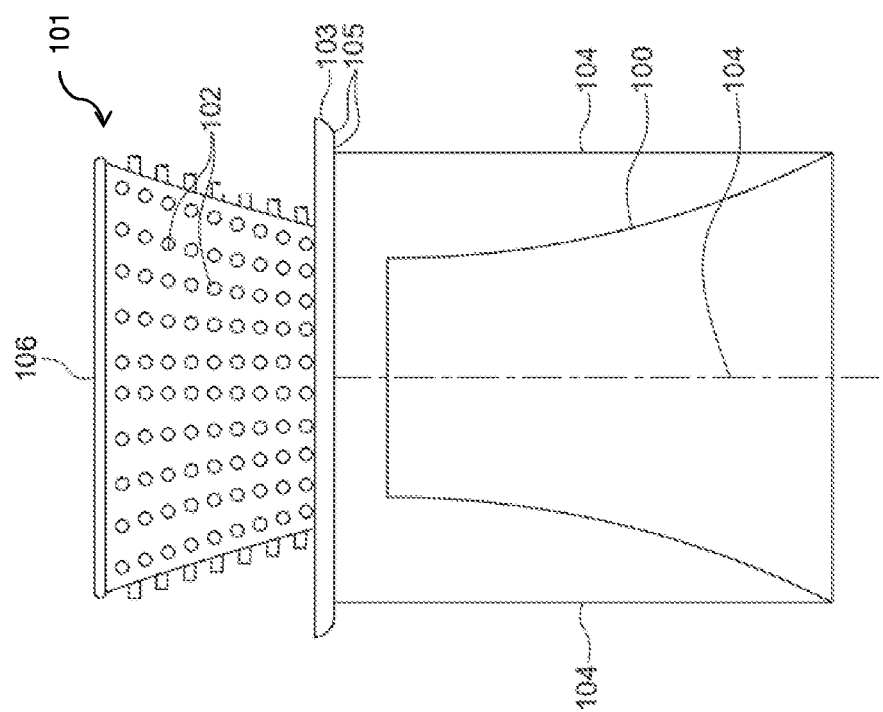
FIG. 8 is a side view of an AAC water collection arrangement for cooling towers according to embodiment.

FIG. 8 is a side view of an AAC water collection arrangement for cooling towers according to embodiment. Cooling tower plumes, e.g., from nuclear power plant cooling towers, are smoke-looking clouds observed when hot water vapor exiting the cooling tower stack condenses to micro-droplets of liquid water in the cooler ambient air as its temperature drops to the dew point. Micro-droplets of liquid water eventually evaporate as the cloud mixes with more ambient air and temperature of the mixture rises above the dew point.

In an embodiment, an AAC water collection arrangement captures the water micro-droplets in a zone around the outlet (top) of a cooling tower stack 100 using a cylindrical plume fog collection structure 101 with a larger diameter than stack 100 before the micro-droplets evaporate. The plume fog collection structure 101 may be erected some vertical distance over the stack 100 to allow ambient air mixing and cooling to condense the water vapor exiting stack 100 to micro-droplets of water. AACs 102 populate the cylindrical wall of plume fog collection structure 101. A top 106 of structure 101 may be sealed with insulated material to prevent heating and eventual water evaporation.

Plume fog exits through AACs 102 due to a pressure difference created by the cylindrical collection structure 101. As plume fog exits through AACs 102 its water is deposited on their internal surfaces. Micro-droplets collected on the internal walls of the AACs 102 due to centrifugal forces and their density being approximately 1000 times that of air coalesce to larger drops and after reaching a critical size dislodge from the internal surface to the bottom of the AACs 102 where a drain discharges liquid water to trough 103. Trough 103 also collects water that may drip from the internal walls of the plume fog collection structure 101.

Collector structure 101 may be supported by columns 104. Support collector structure 101 and trough 103 may be independent of the cooling tower stack for safety reasons. AACs 102 may be loosely draped by an insulating curtain attached to the edge of insulated top 106 and outer periphery of trough 103. Such an insulating curtain may protect AACs 102 from the sun to reduce evaporation of water and heating of the outer surface of plume fog collection structure 101. Water collected by trough 103 may be discharged to storage or recycled to the base of the cooling tower through a drain 105.

Fog collection structure 101 and trough 103 may be made from sheets of plastic such as polycarbonates, or metals such as galvanized steel or aluminum, or other corrosion resistant lightweight materials. Collection structure support columns 104 may be made from galvanized steel. Top 106 may be made from polyurethane coated sheets.

Although various construction methods and materials have been described with respect to the various components of one preferred embodiment of the invention, many other materials and construction methods would be acceptable taking into consideration functional and structural considerations.

The preceding description of the disclosed aspects is provided to enable any person skilled in the art to make, implement, or use the invention defined by the claims. Various modifications to these aspects will be readily apparent to those skilled in the art to make, and the generic principles defined herein may be applied to other aspects without departing from the scope of the claims. Thus, the present disclosure is not intended to be limited to the aspects illustrated herein but is to be accorded the widest scope consistent with the claims disclosed herein.

The invention claimed is:

1. An atmospheric aerosol coalescer (AAC) comprising:
 a body having a conical shape and including
  a top portion,
  a bottom portion,
  a front end,
  a rear end,
  a helical collecting ridge extending from the front end to the rear end, and
  an interior surface having a first inner diameter corresponding to a base of the interior surface and a second inner diameter corresponding the helical collecting ridge, wherein the second inner diameter is greater than the first inner diameter;
 a drain extending from the front end to the rear end along the bottom portion of the body at the second diameter configured to collect liquid from the helical collecting ridge; and
 a drain spout at a rear end of the drain.

2. The AAC of claim 1, wherein the body comprises a plastic material.

3. The AAC of claim 2, wherein the plastic material is UV treated.

4. The AAC of claim 1, wherein the body comprises a graphene material.

5. The AAC of claim 1, wherein the body has a helical shape, and wherein the front end has a larger area than the rear end.

6. The AAC of claim 5, wherein the front end has a diameter between 1 and 20 centimeters.

7. The AAC of claim 1, wherein the interior surface comprises a hydrophobic material.

8. The AAC of claim 1, wherein the the AAC has a mass of about 8 grams or less.

9. An atmospheric aerosol coalescing system comprising:
 a plurality of atmospheric aerosol coalescers (AACs), each ACC including
  a body having a conical shape and including
   a top portion,
   a bottom portion,
   a front end,
   a rear end,
   a helical collecting ridge extending from the front end to the rear end, and
   an interior surface having a first inner diameter corresponding to a base of the interior surface and a second inner diameter corresponding the helical collecting ridge, wherein the second inner diameter is greater than the first inner diameter;
  a drain extending from the front end to the rear end along the bottom portion of the body at the second diameter configured to collect liquid from the helical collecting ridge; and
  a drain spout at a rear end of the drain;
 an AAC array support structure comprising a plurality of cavities, each cavity configured to accept an AAC;
 a main drain configured to receive collected water from a plurality of the AAC drain spouts;
 an aerostat connected to the AAC array support structure, and operable to elevate the AAC array support structure;
 an anchor; and
 a tether connected between the AAC array support structure and the anchor.

10. The atmospheric aerosol coalescing system of claim 9, further comprising:
 a retrieval device operative to retrieve the AAC array support structure including the plurality of AACs when elevated by the aerostat.

11. The atmospheric aerosol coalescing system of claim 9, wherein the AAC array support structure comprises a net.

12. The atmospheric aerosol coalescing system of claim 9, wherein the AAC array support structure comprises an inflatable structure.

13. A method for collecting water from an aerosol containing atmosphere comprising:
 elevating an atmospheric aerosol coalescer (AAC) array support structure comprising a plurality of AACs arranged in an array with an aerostat, each AAC including
  a body having a conical shape and including
   a top portion,
   a bottom portion,
   a front end,
   a rear end,
   a helical collecting ridge extending from the front end to the rear end, and
   an interior surface having a first inner diameter corresponding to a base of the interior surface and a second inner diameter corresponding the helical collecting ridge, wherein the second inner diameter is greater than the first inner diameter,
  a drain extending from the front end to the rear end along the bottom portion of the body at the second diameter configured to collect liquid from the helical collecting ridge, and
  a drain spout at a rear end of the drain;
 collecting coalesced water generated by the plurality of AACs into a main drain;
 directing the water from the main drain to a water collection reservoir.

* * * * *